United States Patent
Speight

[19]

[11] Patent Number: 6,104,768
[45] Date of Patent: Aug. 15, 2000

[54] DIVERSITY ANTENNA SYSTEM

[75] Inventor: Timothy James Speight, Bristol, United Kingdom

[73] Assignee: Lucent Technologies Inc., Murray Hill, N.J.

[21] Appl. No.: 09/281,547

[22] Filed: Mar. 30, 1999

[30] Foreign Application Priority Data

Apr. 3, 1998 [EP] European Pat. Off. .............. 98302654

[51] Int. Cl.⁷ ...................................................... H04L 1/02
[52] U.S. Cl. ............................................................ 375/347
[58] Field of Search ................................... 345/347, 267, 345/336; 455/132

[56] References Cited

U.S. PATENT DOCUMENTS

| | | | |
|---|---|---|---|
| 5,202,903 | 4/1993 | Okanoue | 375/347 |
| 5,349,609 | 9/1994 | Tsujimoto | 375/100 |
| 5,530,725 | 6/1996 | Koch | 375/347 |
| 5,724,390 | 3/1998 | Blaker et al. | 375/229 |

FOREIGN PATENT DOCUMENTS

| | | | |
|---|---|---|---|
| 93112250 | 7/1993 | Guadeloupe | H04B 7/10 |
| PCT/AT97/ 00105 | 5/1997 | WIPO | H04B 7/26 |

OTHER PUBLICATIONS

Wang, H. et al "Adaptive Array Antenna Combined With Tapped Delay Line Using Processing Gain For Direct–Sequence/Spread–Spectrum Multiple–Access System" "Electronics & Communications in Japan, Part I, Communications vol. 76 No. 5, May 1, 1993" pp. 101–113.

*Primary Examiner*—Temesghen Ghebretinsae

[57] ABSTRACT

In order to reduce the effect of multipath propagation, diversity antennas have been proposed in which each antenna in an array has a respective branch tapped delay line in which the tap output signals are weighted and summed. The sums then need to be combined in a way that improves the signal to noise ratio. A diversity antenna system is disclosed in which the branch weights $W_{1S}$ to $W_{MS}$ are determined for each branch by:

- comparing the real part of the summed tap output signals $y_1$ to $y_M$ for the branch with a set level;
- ascribing a symbol value of logical zero to those summed branch tap output signals which fall to one side of the set level and ascribing a symbol value of logical one to those summed branch tap output signals which fall to the other side of the set level;
- calculating the mean of the levels of those signals ascribed the value logical zero and the mean of the levels of those signals ascribed the value logical one;
- calculating the distance between the level of each signal ascribed the value logical zero and the respective mean, and the level of each signal ascribed the value logical one and the respective mean;
- calculating the sum of the distances from the means;
- calculating the distances of the levels of all signals from the set level;
- calculating the sum of the distances of the levels of all signals from the set level;
- calculating the ratio of the sum of the distances from the means to the sum of the distances of the levels of all symbols from the set level; and
- setting the branch weight $W_{1S}$ to $W_{MS}$ dependent on the inverse of the ratio.

2 Claims, 2 Drawing Sheets

DIVERSITY ANTENNA SYSTEM

CROSS-REFERENCE TO RELATED APPLICATION

This application claims priority of European Patent Application No. 98302654.3, which was filed on Apr. 3, 1998.

BACKGROUND OF THE INVENTION

1. Field of The Invention

This invention relates to diversity antenna systems. The background to the invention will be explained with reference to cellular mobile telephone systems, e.g. GSM. Other applications may occur readily to the reader.

2. Description of Related Art

Uplink communications are degraded by multipath propagation, interfering mobile stations using the same channel and by general noise. In order to reduce the effect of multipath propagation, diversity antennas have been proposed in which each antenna in an array has a respective branch tapped delay line in which the tap output signals are weighted and summed. The sums then need to be combined in a way that improves the signal to noise ratio. A conventional combining technique relies on estimation of the channel response and is referred to a maximal ratio combining. The impulse response measurements can be inaccurate leading to suboptimal combining.

SUMMARY OF THE INVENTION

In accordance with the invention, there is provided a diversity antenna system, comprising an array of antennas each of which has a respective branch tapped delay line in which the branch tap output signals are weighted by tap weights and summed, means for weighting each of the branch delay line sums by branch weights; and means for summing the weighted sums, the branch weights being determined for each branch by:

comparing the real part of the summed tap output signals for the branch with a set level;

ascribing a symbol value of logical zero to those summed branch tap output signals which fall to one side of the set level and ascribing a symbol value of logical one to those summed branch tap output signals which fall to the other side of the set level;

calculating the mean of the levels of those signals ascribed the value logical zero and the mean of the levels of those signals ascribed the value logical one;

calculating the distance between the level of each signal ascribed the value logical zero and the respective mean, and the level of each signal ascribed the value logical one and the respective mean;

calculating the sum of the distances from the means;

calculating the distances of the levels of all signals from the set level;

calculating the sum of the distances of the levels of all signals from the set level;

calculating the ratio of the sum of the distances from the means to the sum of the distances of the levels of all symbols from the set level; and setting the branch weight dependent on the inverse of the ratio.

Preferably the tap weights are set so that each branch tap delay line is a matched filter.

BRIEF DESCRIPTION OF THE DRAWINGS

One embodiment of the invention will now be described with reference to the accompanying drawings, in which.

DETAILED DESCRIPTION

Figure 1:
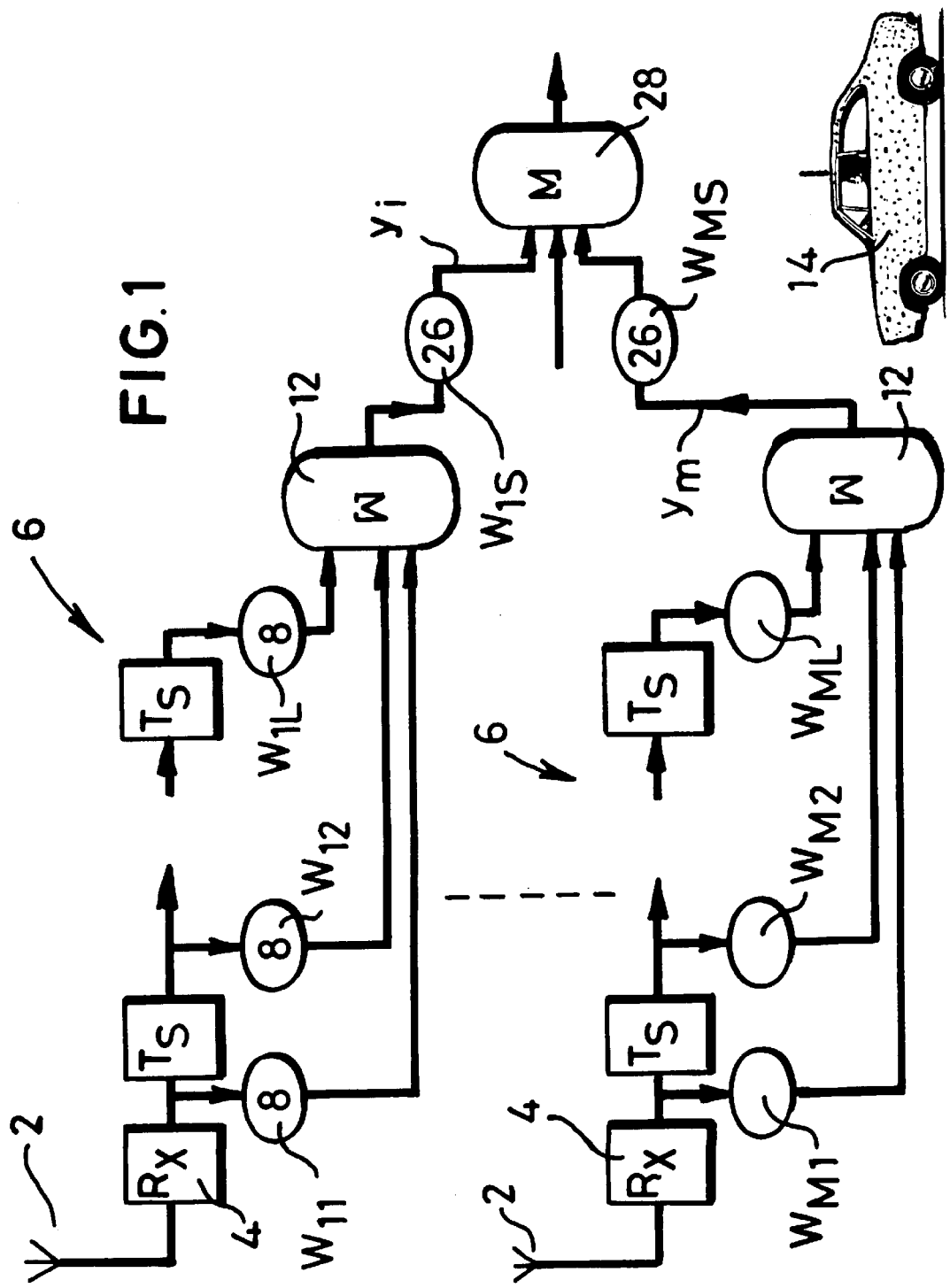
FIG. 1 is a schematic drawing of an adaptive antenna system and its tapped delay line.

Referring to the drawings, each antenna 2 in an array of M antennas is connected to a respective receiver 4. The signals received by the array are gaussian minimum shift key (GMSK) modulated. The signals are de-rotated to remove differential phase encoding which is applied in GMSK modulation. The de-rotated signal from each receiver is fed to a respective tapped delay line 6 which may be physical or simulated by one or more processors. At each tap, the signal is weighted by individual weights $w_{11}$ to $w_{m1}$ by weight setting means 8, and the weighted signals are summed in a summer 12. The sums from each equaliser are summed in a summer 28.

The weights in each branch are calculated by a conventional sliding correlation technique resulting in a matched filter implementation, i.e. the weights are set so that they are matched to the measured channel conditions in each of the branches.

Figure 2:
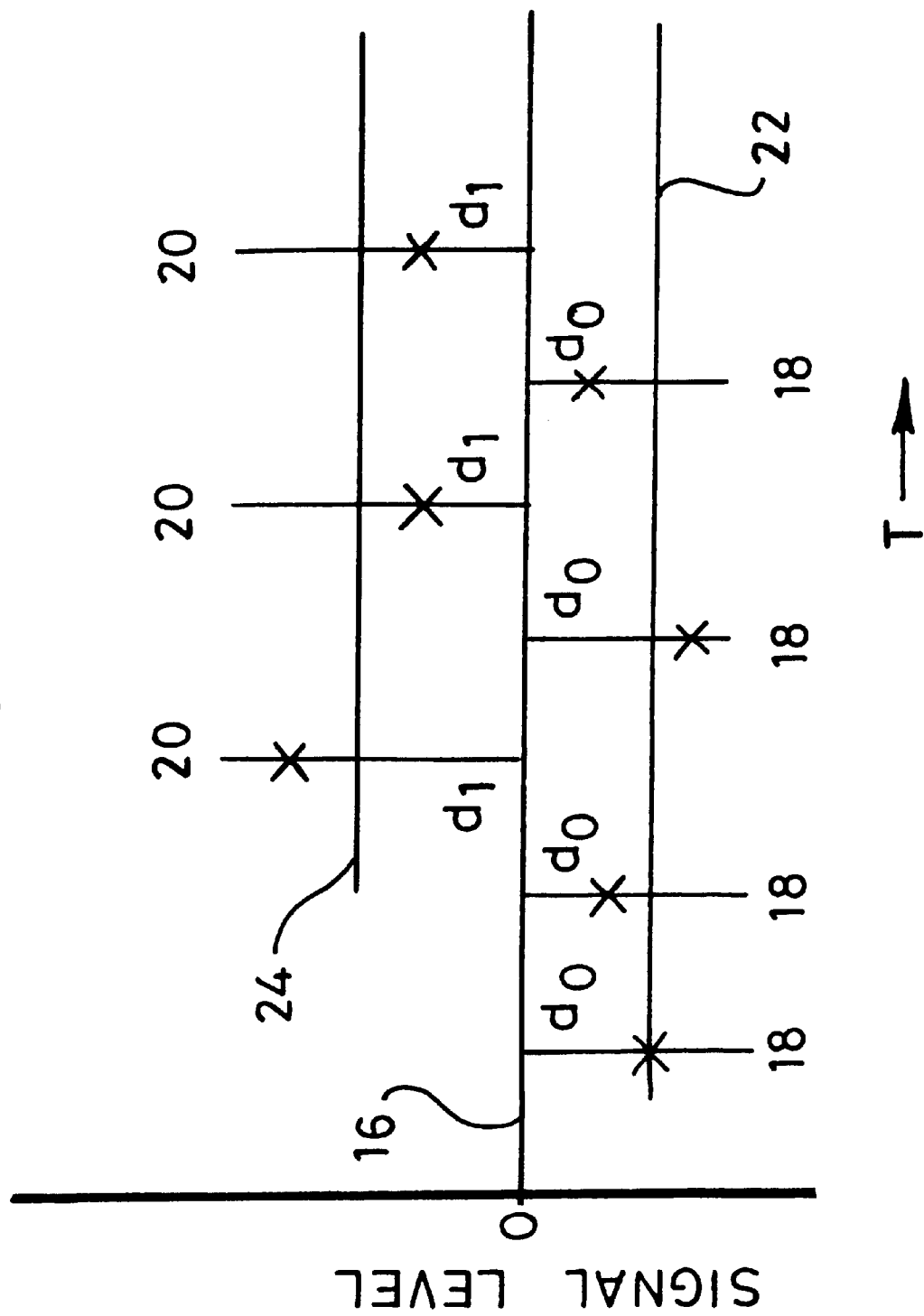
FIG. 2 is an illustrative plot of signal levels out put from the receiver during a training sequence.

A temporary decision to ascribe a symbol value of logical zero or a logical one depends on whether the level of the real part of the output $y_1$ to $y_m$ of the summer 12 is positive or negative. Thus a set decision level 16 of zero (see FIG. 2) distinguishes the level of logical zero symbols 18 from the level of logical one symbols 20.

The mean 22 of the distances $d_0$ between the set level 16 and the levels of the symbols 18 ascribe the value logical zero is calculated. The mean 24 of the distances $d_1$ between the set level 16 and the levels of the symbols 20 symbols ascribed the value logical one is calculated.

The distance between the level of each symbol 18 ascribed the value logical zero and the respective mean 22 is calculated. The distance between the level of each symbol 24 ascribed the value logical one and the respective mean 24 is calculated.

The sum of all the distances from the means is calculated.

The distances of the levels of all symbols from the set decision level 16 is calculated.

The sum of the distances of the levels of all symbols from the set decision level 16 is calculated.

The ratio of the sum of the distances from the means to the sum of the distances of the levels of all symbols from the set level is calculated (the goodness ratio), The smaller this is, the better confidence in the the branch response. There are m goodness ratios calculated.

The sums produced by summers 12 are themselves weighted by weights $W_{1S}$ to $W_{MS}$ in weight setters 26 and summed in summer 28. The weights are proportional to the inverse of the goodness ratio for the respective branch.

What is claimed is:

1. A diversity antenna system, comprising an array of antennas each of which has a respective branch tapped delay line in which the branch tap output signals are weighted by tap weights and summed, means for weighting each of the branch delay line sums by branch weights; and means for summing the weighted sums, the branch weights being determined for each branch by:

comparing the real part of the summed tap output signals for the branch with a set level;

ascribing a symbol value of logical zero to those summed branch tap output signals which fall to one side of the set level and ascribing a symbol value of logical one to those summed branch tap output signals which fall to the other side of the set level;

calculating the mean of the levels of those signals ascribed the value logical zero and the mean of the levels of those signals ascribed the value logical one;

calculating the distance between the level of each signal ascribed the value logical zero and the respective mean, and the level of each signal ascribed the value logical one and the respective mean;

calculating the sum of the distances from the means;

calculating the distances of the levels of all signals from the set level;

calculating the sum of the distances of the levels of all signals from the set level;

calculating the ratio of the sum of the distances from the means to the sum of the distances of the levels of all symbols from the set level; and setting the branch weight dependent on the inverse of the ratio.

2. An antenna system as claimed in claim 1, wherein the tap weights are set so that each branch tap delay line is a matched filter.

* * * * *